United States Patent Office 2,990,430
Patented June 27, 1961

2,990,430
DESULFURATION PROCESS FOR PREPARING SYMMETRICAL UNSATURATED HYDROCARBONS
Max H. Stern, Rochester, N.Y., assignor to Eastman Kodak Company, Rochester, N.Y., a corporation of New Jersey
No Drawing. Filed Mar. 11, 1959, Ser. No. 798,576
15 Claims. (Cl. 260—666)

This invention relates to the preparation of symmetrical polyene compounds, and more particularly, to the desulfuration of novel sulfur-containing derivatives to such symmetrical unsaturated hydrocarbons as β-carotene and the like.

Many symmetrical polyene compounds are useful materials as coloring agents. The compound, β-carotene, is useful in that it is not only highly colored but it also has vitamin A activity. Thus, β-carotene has considerable utility for coloring and fortifying food products, particularly such fatty materials as margarine and the like.

Carrots, palm oil, alfalfa and other materials have been employed as natural sources of β-carotene. However, β-carotene has also been prepared synthetically and there are several known synthetic methods for its preparation.

Likewise, other symmetrical polyene hydrocarbons have been prepared by various chemical procedures.

However, as such symmetrical unsaturated hydrocarbons as β-carotene are complex, long-chain, conjugated materials, equally complex methods have been employed to prepare these compounds by chemical synthesis.

It is an object of this invention to provide a new chemical synthesis for preparing symmetrical polyene compounds.

It is another object of this invention to provide a new method for preparing β-carotene.

It is still another object of this invention to provide a new method for desulfurating certain sulfur-containing derivatives to symmetrical polyene hydrocarbons.

It is likewise an object of this invention to prepare β-carotene from a sulfur-containing derivative derived from vitamin A aldehyde.

The process of the invention comprises desulfurating the sulfur-containing derivative such as results from the reaction of hydrogen sulfide and certain unsaturated aldehydes at low temperatures and thereby forming a symmetrical polyene hydrocarbon. The desulfuration is effected by treating such a sulfur-containing derivative under substantially anhydrous conditions at an elevated temperature below the decomposition temperature of the polyene hydrocarbon reaction product in the presence of at least an equal molar proportion of a desulfurating phosphorus-containing compound selected from the class of compounds having the formulas

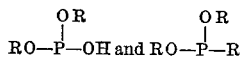

wherein R is a monovalent hydrocarbon radical.

The preparation of the sulfur-containing derivatives from hydrogen sulfide and unsaturated aldehydes is described in detail in Chechak and Robeson application U.S. Serial No. 798,575, now abandoned, entitled "Substituted Thiapyrans and Their Method of Preparation" which was filed concurrently herewith. In general, the sulfur-containing derivative can be prepared by reacting gaseous hydrogen sulfide with an unsaturated aldehyde having the formula

wherein R is a monovalent hydrocarbon radical and R' is an alkyl radical. The substituent R can suitably be a straight-chained, a branch-chained or cyclic hydrocarbon radical, and is preferably a hydrocarbon radical terminating in a β-ionone ring having the structure

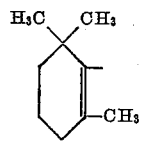

The substituent R' can be suitably either straight-chained or branch-chained, usually an alkyl radical containing 1 to 6 carbon atoms, and preferably a methyl radical. The sulfuration of the unsaturated aldehyde is effected at a reduced or depressed temperature lower than room temperature (about 20° C.), with temperatures in the range of —40° C. to 15° C. being usually employed and temperatures in the range of —20° C. to 10° C. being preferred. Typical unsaturated aldehydes include vitamin A aldehyde and isoprenologues thereof such as β-ionylideneacetaldehyde; 3-methyl-7-phenyl-2,4,6-heptatrienal, pseudo-vitamin A aldehyde and isoprenologues thereof, 3-methyl-5-phenyl-2,4-pentadienal, 3-ethyl-5-napthyl-2,4-pentadienal, 3-isopropyl-5-cyclobutyl-2,4-pentadienal, 3-methyl-2,4-hexadienal, 3-n-butyl-6-phenyl-2,4-hexadienal, 3-n-hexyl-5-bornyl-2,4-pentadienal, and related unsaturated aldehydes having the general structure described above. The preparation of the sulfur-containing derivative from an unsaturated aldehyde can be represented by the following equation,

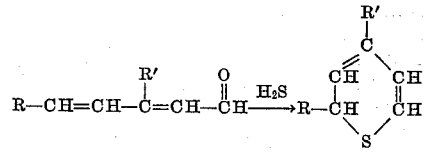

In accordance with the invention two molar proportions of the sulfur-containing derivative are converted to a symmetrical polyene hydrocarbon which can be represented by the following equation,

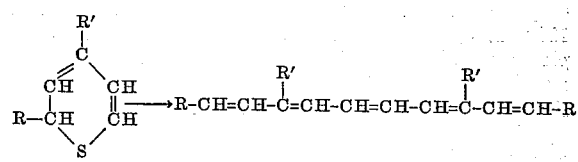

The sulfur-containing derivative prepared by reacting hydrogen sulfide and vitamin A aldehyde, and which derivative can be readily converted to β-carotene in accordance with the invention, is characterized as having the formula

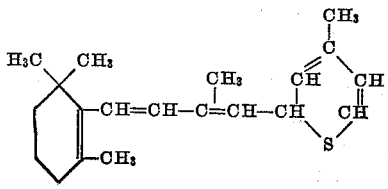

The desulfurating agents of the invention are esters of phosphorous and phosphonous acids having the general formulas

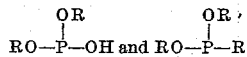

wherein R is a monovalent hydrocarbon radical and desirably an alkyl radical having 1 to 8 carbon atoms and preferably 1 to 4 carbon atoms or an aryl radical such as a phenyl radical. Typical phosphite and phosphonite desulfurating agents that can be employed in the present process include phenyl diisobutyl phosphonite, phenyl diphenyl phosphonite, phenyl diethyl phosphonite, isobutyl diisobutyl phosphonite, ethyl diethyl phosphonite, phenyl disitosteryl phosphonite, phenyl diamyl phosphonite, diethyl phosphite, diphenyl phosphite, di-n-butyl phosphite and related esters of phosphonous and phosphorous acids. With respect to the terminology employed herein to name the present phosphonite esters, the term for the R substituent attached to he oxygen atoms occurs next to the term "phosphonite," and the term for the R substituent attached directly to the phosphorus atom precedes the aforementioned other R substituent term. For example, a compound termed "phenyl dimethyl phosphonite" has the following formula:

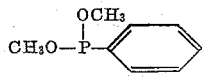

At least a molar proportion of the subject phosphorus-containing compounds is employed as the desulfurating agent for each molar proportion of the sulfur-containing compound or thio-intermediate to prepare symmetrical unsaturated hydrocarbons in accordance with the invention. Stoichiometric excesses of the phosphite or phosphonite ester can be suitably employed but are not necessary.

The reaction is effected in a reaction medium substantially inert to the reactants. As the subject desulfurating agents react with water, substantially anhydrous reaction conditions are used. Likewise, substantially inert solvents are used, although the reaction can be effected in the absence of a solvent. Substantially inert non-polar organic solvent media are usually employed in the present desulfuration process. Preferred solvents are non-polar hydrocarbon solvents having 5 to 10 carbon atoms such as benzene, toluene, cyclohexane, n-hexane, petroleum ethers, and other non-polar solvents that are substantially non-reactive to, or inert to, the reactants.

The present desulfuration reaction is effected at an elevated temperature of usually at least about 35° C. and below the temperature at which substantial deterioration or decomposition of the symmetrical polyene hydrocarbon reaction product takes place, temperatures in the range of about 50° C. to 125° C. being more usually employed, and temperatures in the range of 80° C. to 120° C. being preferred. Under more commonly employed reaction conditions, the desulfuration can be substantially completed in about 1 to 10 hours, although shorter or longer reaction periods may be desired depending on such reaction variables as the reaction temperature, the particular desulfurating agent and the amount employed, the amount of agitation, the nature of the sulfur-containing starting material, the dilution of the reactants in the reaction medium, and related reaction variables. The completion of the desulfuration reaction can be determined from the infrared absorption spectrum of the reaction mixture.

The desulfuration reaction product of the invention can be worked-up or purified by conventional methods, typical of such methods being solvent extraction, chromatographic adsorption and crystallization. The symmetrical polyene hydrocarbon resulting from the present process is a mixture of geometrical isomers, which isomers can be separated from each other or isomerized to other isomers by conventional methods. For example, β-carotene prepared in accordance with the present process is a mixture of geometrical isomers that can be utilized as coloring and vitamin A fortifying materials as such, or this isomeric mixture can be converted to the all-trans isomer. A typical method for converting or isomerizing an isomeric β-carotene reaction product to all-trans β-carotene is to dissolve the isomeric mixture in a solvent such as petroleum ether (B.P. 30–60 C.), add a small amount of iodine such as 20 mg. of iodine per gram of β-carotene concentrate, stir the resulting mixture at room temperature for about an hour, remove the iodine, add ethyl formate, cool the mixture to about −20° C., and thereby crystallize therefrom all-trans β-carotene. The resulting filtrate can again be isomerized with iodine, and more all-trans β-carotene crystallized out as before. Similar methods can be employed to treat the reaction products containing other symmetrical polyene hydrocarbons.

The invention is further illustrated by the following examples of preferred embodiments thereof.

*Example I*

A. A solution of 6 g. of 2-cis,6-trans vitamin A aldehyde in 60 cc. of dry pyridine was cooled to −10° C. and treated with hydrogen sulfide for five hours at this temperature. After de-gassing by stirring at room temperature the reaction product was diluted with diethyl ether and the resulting ether extract washed successively with 10% sulfuric acid, saturated sodium bicarbonate, and water. After drying over anhydrous sodium sulfate the solvent was evaporated to give 5.7 g. of a sulfur-containing compound as an orange oil having E(1%, 1 cm.)(275 mμ)=490 in petroleum ether (B.P. 60–70° C.).

B. A solution of 0.64 g. of the sulfur-containing compound of Example IA in 6.4 cc. of benzene was treated with 2.5 cc. of phenyl diisobutyl phosphonite and refluxed on a steam bath under a nitrogen atmosphere for two hours under substantially anhydrous conditions. The benzene solvent was evaporated to give a 3.2 g. concentrate of β-carotene having E(1%, 1 cm.)(448 mμ)=225 in petroleum ether (B.P. 60–70° C.). This product was diluted with 15 cc. of methanol and chilled overnight at 5° C. The resulting precipitate was collected, washed with methanol, and dried under vacuum to give a 0.41 g. β-carotene concentrate having E(1%, 1 cm.) (448 mμ)=1520 in petroleum ether (B.P. 60–70° C.). The infrared absorption spectrum of the reaction product confirmed the presence of the β-carotene structure. A desulfuration reaction was effected in the same manner only in the absence of the phenyl diisobutyl phosphonite reagent and about one sixth as much β-carotene resulted as was obtained with the phenyl diisobutyl phosphonite reagent.

*Example II*

A solution of a 0.5 g. portion of the sulfur-containing compound prepared as in Example IA in 5 cc. of benzene was refluxed with 2.5 g. of isobutyl diisobutyl phosphonite and worked-up as described in Example IB. A 3.0 g. concentrate of β-carotene resulted which had E(1%, 1 cm.)(447 mμ)=164 in petroleum ether (B.P. 60–70° C.).

*Example III*

A solution of 0.5 g. portion of the sulfur-containing compound prepared as in Example IA in 10 cc. of toluene was treated with 2.0 g. of ethyl diethyl phosphonite and worked-up as described in Example IB. A 2.5 g. concentrate of β-carotene resulted which had E(1%, 1 cm.) (446 mμ)=120 in petroleum ether (B.P. 60–70° C.).

*Example IV*

A solution of a 0.5 g. portion of the sulfur-containing compound prepared as in Example IA in 5 cc. of toluene was heated on a steam bath with 2.5 g. of diethyl phosphite and worked-up as described in Example IB. A 3.0 g. concentrate of β-carotene resulted which had E(1%, 1 cm.)(445 mμ)=85 in petroleum ether (B.P. 60–70° C.).

*Example V*

A. A solution of 1.0 g. portion of the sulfur-containing compound prepared as in Example IA in 10 cc. of toluene was heated on a steam bath with 8 g. of phenyl disitosteryl phosphonite for sixteen hours in a nitrogen atmosphere under substantially anhydrous conditions. A 9.0 g. concentrate of β-carotene resulted which had E(1%, 1 cm.)(445 mμ)=29 in petroleum ether (B.P. 60–70° C.).

B. The phenyl disitosteryl phosphonite desulfurating agent was prepared by slowly adding 10.2 g. of benzene phosphorous dichloride to 47 g. of sitosterol and 9.2 g. of pyridine in 200 cc. of diethyl ether. The resulting mixture was stirred for 2 hours under a nitrogen atmosphere. Thereafter the reaction mixture was filtered and the resulting filtrate evaporated at 50–60° C. to give a white-tan product, phenyl disitosteryl phosphonate, melting at 55–62° C. Elemental analysis of the product indicated 3.6% phosphorous (3.33% theoretical).

*Example VI*

A. A solution of 2.0 g. of 3-methyl-7-phenyl-2,4,6-heptatrienal in 20 cc. of dry pyridine was cooled to −10° C. and treated with hydrogen sulfide for five hours at this temperature. After de-gassing, the reaction product was diluted with diethyl ether and the resulting ether extract washed with water to neutrality. After drying over anhydrous sodium sulfate, the ether solvent was evaporated to give 2.0 g. of a sulfur-containing compound as a yellow oil having E(1%, 1 cm.)(259 mμ)=750 in petroleum ether (B.P. 60–70° C.).

B. A solution of a 0.48 g. portion of the sulfur-containing compound from Example VIA in 3 cc. of benzene was heated with 1.2 g. of phenyl diisobutyl phosphonite in 2 cc. of toluene as described in Example IB. The solvent was evaporated to give a concentrate of a polyene of the structure

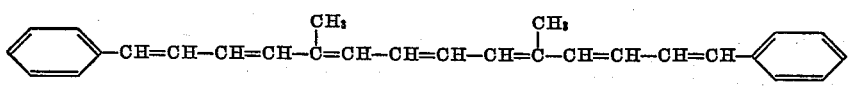

having E(1%, 1 cm.)(426 mμ)=231 in petroleum ether (B.P. 60–70° C.). A sample of the polyene purified as described in Example IB had E(1%, 1 cm.)(433 mμ)=4090 in petroleum ether (B.P. 60–70° C.).

C. The phenyl diisobutyl phosphonite desulfurating agent was prepared by slowly adding 3.58 g. of benzene phosphorous dichloride to 29.6 g. of isobutyl alcohol and 3.18 g. of pyridine in 330 cc. of diethyl ether. The resulting mixture was stirred for 1 hour under a nitrogen atmosphere. Thereafter the reaction mixture was filtered, solvent stripped off the resulting filtrate by distillation, the remaining residue distilled under a pressure of 7–8 mm. of mercury and fractions boiling at 80–85° C. having $n_D^{20}$ 1.4992 and boiling at 85–92° C. having $n_D^{20}$ 1.4986 were collected. These two fractions were combined and used as the desulfurating agent.

D. The 3-methyl-7-phenyl-2,4,6-heptatrienal reactant was prepared from the corresponding carboxylic acid by esterifying the acid to form an ester, reducing the ester with a metal hydride to form the alcohol, and thereafter oxidizing the alcohol to the subject aldehyde reactant. A 6 g. portion of 3-methyl-7-phenyl-2,4,6-heptatrienoic acid in about 100 cc. of methyl ethyl ketone was combined with 20 g. of methyl iodide and 5.5. g. of potassium carbonate. The resulting mixture was refluxed for 2 hours to yield 7 g. of the methyl ester of 3-methyl-7-phenyl-2,4,6-heptatrienoic acid. A .0307 mole portion of the methyl ester was treated with a .0370 mole portion of lithium aluminum hydride in 100 cc. of diethyl ether at 0° C. for 10 minutes to yield 6.1 g. of 3-methyl-7-phenyl-2,4,6-heptatrienol. A .015 mole portion of the resulting alcohol was oxidized to the corresponding aldehyde by treating the alcohol with 45 g. of manganese dioxide in 45 cc. of diethyl ether at room temperature for 20 hours. The resulting 3-methyl-7-phenyl-2,4,6-heptatrienal had E(1%, 1 cm.)(351 mμ)=1735 in ethanol.

*Example VII*

A. Lycopene is prepared by reacting a solution of 2.0 g. of pseudo-vitamin A aldehyde, having the formula

dissolved in 20 cc. of pyridine as described in Example VIA, and by thereafter desulfurating a 0.48 g. portion of the resulting sulfur-containing reaction product in a toluene reaction medium with 1.2 g. of diphenyl phosphite as described in Example VIB.

B. The pseudo-vitamin A aldehyde reactant is prepared from pseudo-ionone. A 30 g. portion of pseudo-ionone was combined with 23 g. of propargyl bromide and 4.7 g. of magnesium in 130 cc. of diethyl ether and the reaction mixture refluxed for 50 minutes. To the resulting reaction mixture was added a 57 cc. diethyl ether solution containing 18.9 g. of ethyl magnesium bromide over a 35 minute period, the resulting mixture refluxed 3 hours, held for about 14 hours at room temperature and then cooled to 0° C. To the resulting cooled mixture, 19.4 g. of 4,4-dimethoxy-2-butanone was added over a one-hour period, and thereafter the reaction mixture was stirred at room temperature for 4 hours. The resulting reaction mixture was then treated with about 100 cc. of 2 N sulfuric acid at 0° C., the reaction mixture extracted with diethyl ether, and the ether fraction washed with 2 N sulfuric acid and then with water. A 10 g. portion of the resulting acetylenic diol acetal compound was hydrogenated in the presence of 5% palladium on charcoal and .5 g. of quinoline in 100 cc. of methyl ethyl ketone to reduce the acetylenic bond to an olefinic bond. A 6.5 g. portion of the resulting reduced compound was refluxed in 90 cc. of methyl ethyl ketone with .7 g. of pyridine and .75 cc. of concentrated hydrochloric acid. The resulting pseudo-vitamin A aldehyde reaction product was taken up in diethyl ether, washed with 5% sulfuric acid and then with water. The pseudo-vitamin A aldehyde reaction product was further purified by chromatographing on sodium aluminum silicate to yield a product having E(1%, 1 cm.)(397 mμ)=1045 (ethanol).

The present invention thus provides a new method for desulfurating the sulfur-containing derivative resulting from the reaction of hydrogen sulfide and certain unsaturated aldehydes at low temperatures to form symmetrical polyene hydrocarbons.

Although the present invention has been described in considerable detail with reference to certain preferred embodiments thereof, it will be understood that variations and modifications can be effected within the spirit and scope of the invention as described hereinabove and as defined by the appended claims.

I claim:
1. The process for desulfurating a sulfur-containing derivative having the formula

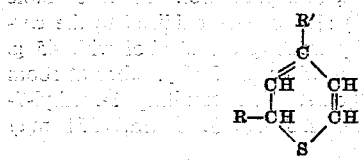

wherein R is a monovalent hydrocarbon radical and R' is an alkyl radical and forming a symmetrical unsaturated hydrocarbon having the formula

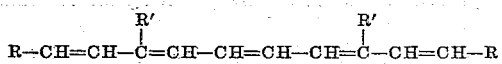

which comprises treating said derivative under substantially anhydrous conditions at an elevated temperature of at least about 35° C. and below the decomposition temperature of the said unsaturated hydrocarbon reaction product in the presence of at least an equal molar proportion of a phosphorus-containing compound selected from the class consisting of compounds having the formulas

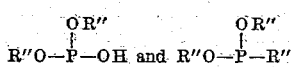

wherein R'' is a monovalent hydrocarbon radical.

2. The process for desulfurating a sulfur-containing vitamin A derivative having the formula

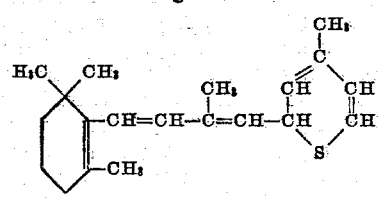

and forming β-carotene, which comprises treating said derivative in a substantially inert non-polar solvent reaction medium under substantially anhydrous conditions at an elevated temperature of at least about 35° C. and below the decomposition temperature of the β-carotene reaction product in the presence of at least an equal molar proportion of a phosphorus-containing compound selected from the class consisting of compounds having the formulas

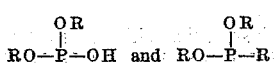

wherein R is a monovalent hydrocarbon radical.

3. The process for desulfurating a sulfur-containing vitamin A derivative having the formula

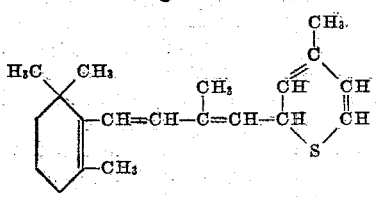

and forming β-carotene, which comprises treating said derivative in a hydrocarbon solvent having 5 to 10 carbon atoms under substantially anhydrous conditions at a temperature in the range of 50° C. to 125° C. in the presence of at least an equal molar proportion of a desulfurating agent having the formula

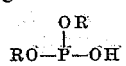

wherein R is a monovalent hydrocarbon radical.

4. The process according to claim 3 wherein the R substituent on the desulfurating agent is a phenyl group.

5. The process according to claim 3 wherein the R substituent on the desulfurating agent is an alkyl group having 1 to 8 carbon atoms.

6. The process for desulfurating a sulfur-containing vitamin A derivative having the formula

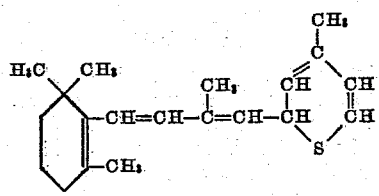

and forming β-carotene, which comprises treating said derivative in a hydrocarbon solvent having 5 to 10 carbon atoms under substantially anhydrous conditions at a temperature in the range of 50° C. to 125° C. in the presence of at least an equal molar proportion of a desulfurating agent having the formula

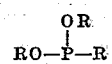

wherein R is a monovalent hydrocarbon radical.

7. The process according to claim 6 wherein the R substituent on the desulfurating agent is a phenyl group.

8. The process according to claim 6 wherein the R substituent on the desulfurating agent is an alkyl group having 1 to 8 carbon atoms.

9. The process for desulfurating a sulfur-containing vitamin A derivative having the formula

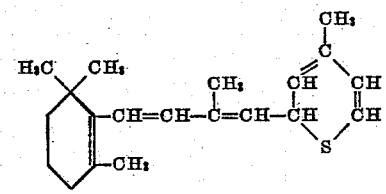

and forming β-carotene, which comprises treating said derivative in a benzene solvent medium under substantially anhydrous conditions at a temperature in the range of 50° C. to 125° C. in the presence of at least an equal molar proportion of phenyl diisobutyl phosphonite.

10. The process for desulfurating a sulfur-containing vitamin A derivative having the formula

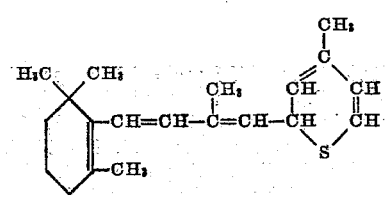

and forming β-carotene, which comprises treating said derivative in a benzene solvent medium under substantially anhydrous conditions at a temperature in the range of 50° C. to 125° C. in the presence of at least an equal molar proportion of isobutyl diisobutyl phosphonite.

11. The process for desulfurating a sulfur-containing vitamin A derivative having the formula

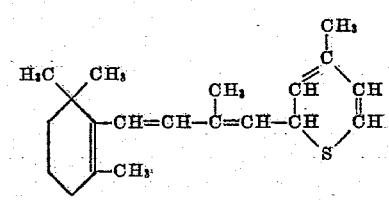

and forming β-carotene, which comprises treating said derivative in a toluene solvent medium under substantially anhydrous conditions at a temperature in the range of 50° C. to 125° C. in the presence of at least an equal molar proportion of ethyl diethyl phosphonite.

12. The process for desulfurating a sulfur-containing vitamin A derivative having the formula

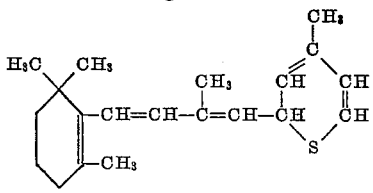

and forming β-carotene, which comprises treating said derivative in a toluene solvent medium under substantially anhydrous conditions at a temperature in the range of 50° C. to 125° C. in the presence of at least an equal molar proportion of diethyl phosphite.

13. The process for desulfurating a sulfur-containing derivative having the formula

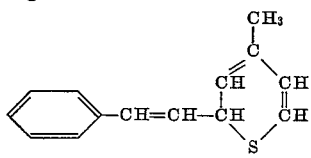

and forming a symmetrical unsaturated hydrocarbon having the formula

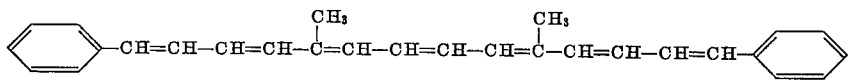

which comprises treating said derivative in a toluene solvent medium under substantially anhydrous conditions at a temperature in the range of 50° C. to 125° C. in the presence of at least an equal molar proportion of phenyl diisobutyl phosphonite.

14. The process for desulfurating a sulfur-containing derivative having the formula

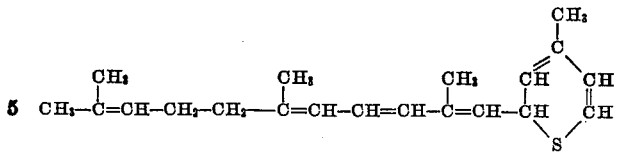

and forming lycopene, which comprises treating said derivative in a toluene solvent medium under substantially anhydrous conditions at a temperature in the range of 50° C. to 125° C. in the presence of at least an equal molar proportion of diphenyl phosphite.

15. The process of desulfurating a sulfur-containing derivative having the formula

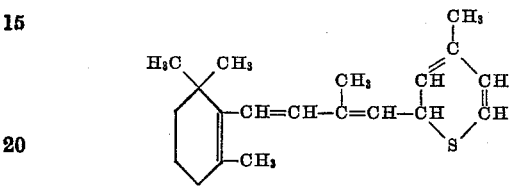

and forming β-carotene, which comprises treating said derivative under substantially anhydrous conditions at a elevated temperature of at least about 35° C. and below the temperature at which substantial decomposition of β-carotene occurs in the presence of at least an equal molar proportion of a phosphorus-containing desulfurating agent selected from the class consisting of phenyl diisobutyl phosphonite, isobutyl diisobutyl phosphonite, diethyl phosphite and phenyl disitosteryl phosphonite.

References Cited in the file of this patent
UNITED STATES PATENTS 2,866,753     Ayers _____ Dec. 30, 1958